United States Patent [19]

van der Meer

[11] Patent Number: 5,042,179
[45] Date of Patent: Aug. 27, 1991

[54] STEAM IRON HAVING PLURAL HEATING ELEMENTS AND A CONTROL CIRCUIT REGULATING TIMED HEATING ELEMENT POWER

[75] Inventor: Sijtze van der Meer, Groningen, Netherlands

[73] Assignee: U.S. Philips Corp., New York, N.Y.

[21] Appl. No.: 467,695

[22] Filed: Jan. 18, 1990

[30] Foreign Application Priority Data

Mar. 29, 1989 [NL] Netherlands ............ 8900749

[51] Int. Cl.⁵ ............ D06F 75/16; D06F 75/18; D06F 75/26
[52] U.S. Cl. ............ 38/77.83; 38/77.8; 38/77.7; 38/1 C; 38/1 D; 38/77.1; 38/77.5; 38/75
[58] Field of Search ............ 38/75, 77.83, 1 C, 1 D, 38/77.1, 77.5, 77.7, 77.8, 77.81, 77.9, 74, 85

[56] References Cited

U.S. PATENT DOCUMENTS 4,745,260 5/1988 Albinger ............ 38/1 D

FOREIGN PATENT DOCUMENTS

| 0232924 | 8/1987 | European Pat. Off. . | |
|---|---|---|---|
| 2543180 | 9/1984 | France | 38/77.7 |
| 1005900 | 1/1986 | Japan | 38/1 C |
| 1176398 | 8/1986 | Japan | 38/77.8 |
| 2026100 | 2/1987 | Japan | 38/77.1 |
| 1242100 | 9/1989 | Japan | 38/74 |
| 8203520 | 10/1982 | PCT Int'l Appl. | 38/82 |
| 2175105 | 11/1986 | United Kingdom | 38/1 C |

Primary Examiner—Andrew M. Falik
Assistant Examiner—Ismael Izaguirre
Attorney, Agent, or Firm—Ernestine C. Bartlett

[57] ABSTRACT

An electric steam iron has two heating elements (21, 41), each of high wattage. The elements heat the soleplate (20) and a water tank of a steam generator (40). The elements are connected in such a way that they cannot be switched on simultaneously. The quantity of steam which is delivered by the iron during ironing is regulated by an electronic circuit (FIG. 2) which controls the heating of the steam generator. The heating takes place in a manner in which the steam delivery varies depending on the steam requirements during an ironing cycle (FIGS. 4a-4e). The steam generator can be designed as a pressure tank in which a buffer stock of steam is formed during an interruption in ironing, so that at the beginning of an ironing cycle a large quantity of steam can be delivered and at the same time the soleplate can be heated up.

22 Claims, 8 Drawing Sheets

STEAM IRON HAVING PLURAL HEATING ELEMENTS AND A CONTROL CIRCUIT REGULATING TIMED HEATING ELEMENT POWER

FIELD OF THE INVENTION

The invention relates to an electric steam iron, comprising a housing, a soleplate connected thereto and provided with steam outlets, a first heating element for heating the soleplate, a steam generator connected via a steam pipe to the steam outlets in the soleplate, and a second heating element for heating the steam generator.

BACKGROUND OF THE INVENTION

Such a steam iron is known from EP-A 232 924 which corresponds substantially to U.S. Pat. No. 4,939,342. The steam iron disclosed in this patent application and patent produces a relatively large quantity of steam compared with earlier known steam irons. This large steam production not only serves to moisten the articles being ironed, but also helps to heat them up, the latter being partly a result of the condensation of the steam in the fabric. For energy-saving reasons the steam production is interrupted when the iron is not being used.

In an ironing process periods of active ironing, i.e. the ironing cycles, are alternated with pauses to move the article being ironed or to replace it by an unironed article. As already described in the above-mentioned Patent Application EP-A 232 924, an ironing cycle can be divided roughly into two phases. During the first phase the article is heated and moistened by means of the steam introduced into the article, while during the second phase the moisture is evaporated from the article, and the latter is simultaneously smoothed under pressure.

The known steam iron has the disadvantage that the delivery of steam is constant during an ironing cycle and the iron also delivers a large quantity of steam during the above-mentioned second phase.

SUMMARY OF THE INVENTION

An object of the invention is to provide a steam iron in which the steam production varies depending on the phase in the ironing cycle.

The steam iron according to the invention is for that purpose characterized in that the steam iron has a control circuit for regulating the output power of the second heating element during an ironing cycle. This means that during the above-described second phase of an ironing cycle the steam production can be considerably lower than during the beginning of a cycle. The steam production can even be stopped completely at the end of a cycle, if desired. This regulation has a number of advantages. Evaporation of the moisture from the article being ironed takes place faster because less steam is introduced, and the ironed article is drier at the end. There is also a certain saving in energy, due to the fact that less water has to be vaporized per ironing cycle, topping-up with water is required less frequently, and less water vapor goes into the room in which the ironing is taking place, so that it does not have to be ventilated as thoroughly. It has also been found that a better ironing result is obtained in this way.

The above-mentioned control circuit can be fairly simple and can, for example, be designed exclusively for generating the maximum output in the second heating element for a short period at the beginning of an ironing cycle and subsequently for operating said element at a lower and virtually constant level. The steam iron according to the invention is further characterized in that the control circuit is designed in such a way that the output from the second heating element decreases at least during part of an ironing cycle. With proper regulation, the steam production is adapted to the steam requirements. The control circuit can, however, also be designed to make the heat output increase during an ironing cycle. This is necessary, for example, when the steam generator is provided with a pressure tank in which a buffer stock of steam is stored which has to be topped-up later on in the ironing cycle.

In a first embodiment of the steam iron according to the invention, the control circuit has time-measuring means and is equipped for regulation of the output power of the second heating element at least partly as a function of the time elapsing during an ironing cycle. Since the length of an ironing cycle is determined by the surface area to be ironed and the user's ironing speed, parameters which show only a limited variation, a time-controlled steam production is adequate in a large number of cases.

In a second embodiment of the steam iron according to the invention, the steam iron is provided with means for measuring the heat output of the first heating element, and the control circuit is designed for controlling the output of the second heating element at least partly as a function of the above-mentioned heat output. The steam production in this embodiment is controlled by the amount of heat required to heat the articles being ironed all the way through. The steam production is thus adapted dynamically to the article being ironed, which leads to the optimum ironing result with limited steam consumption.

In order to have steam rapidly available again after a break between two ironing cycles, during which the steam output is interrupted, the control circuit is designed for maintaining the temperature of the steam generator when no steam is required. This can be achieved by using a temperature sensor to maintain the temperature of the steam generator at a fixed value, which is, for example, at or just below boiling point at the prevailing pressure in the steam generator.

Before the ironing can be started, the steam generator must be brought to temperature when the iron has been switched on. Since in the steam iron according to the invention the steam production is regulated by the supply of electric current to the second heating element, the boiling temperature of the water at the desired pressure in the steam generator must be established before the iron is ready for use. The boiling temperature must actually be measured each time the iron is used, since it can vary by a number of degrees as a result of pressure differences occurring in the atmosphere, or in the case of use at various altitudes.

For this purpose, the control circuit has a temperature sensor for measuring the temperature of the steam generator, and the control circuit is equipped for determining the boiling temperature of the water in the steam generator by measuring the temperature change per unit time. While the steam generator is heating up at a constant output, the temperature of the steam generator rises approximately in a linear manner. When the water temperature approaches boiling temperature, water is converted into steam, which reduces the degree of temperature increase. The boiling point is determined by detecting this reduction, and the boiling temperature is then measured and stored in a memory present in the control circuit.

Preferably, in a preferred embodiment of the invention provision is made in the steam pipe for a steam valve by means of which the steam pipe can be shut off, and the steam generator has a pressure tank in which pressure builds up relative to the ambient pressure which can build up in it an excess pressure relative to the ambient pressure. This makes it possible for the steam generator to be heated with the steam valve closed during a break or standby period until a considerable excess pressure relative to the ambient pressure and a corresponding temperature prevail therein, for example approximately $10^5$ Pa and approximately 120° C. At this pressure and temperature the steam generator contains, as it were, a buffer stock of steam, which is released to the article being ironed via the steam pipe and the steam outlets after the steam valve is opened at the beginning of an ironing cycle. Due to the fact that the pressure inside the steam generator falls, the water starts to boil, and steam is formed until the temperature has decreased after a number of seconds and the excess pressure has reduced to a threshold value of, for example, $0.2 \cdot 10^5$ Pa. The decreasing pressure means a decreasing steam delivery during the first phase of an ironing cycle. After a number of seconds, for example a time interval of a preset duration, or the duration of which is determined by the pressure or temperature in the steam generator, the second heating element is switched on by the control circuit for keeping the steam delivery up to the mark during the remainder of the ironing cycle. The steam delivery is stabilized at a predetermined level by switching on and off the second heating element with a fixed duty cycle. By varying the duty cycle, for example as a function of time and/or as a function of the heat delivery of the soleplate, it is possible to vary the steam delivery depending on steam requirements.

In a preferred embodiment of the invention the control circuit has a temperature sensor for measuring the temperature of the steam generator and a pressure sensor for measuring the pressure in the steam generator, and the control circuit is designed for determining the maximum temperature of the water in the steam generator by measuring the temperature when the pressure in the steam generator is equal to a predetermined pressure or is of a predetermined difference from the ambient pressure. In this way the maximum desired temperature of the water is determined on the basis of the rising pressure in the steam generator.

This embodiment can also be the above-mentioned temperature sensor disposed on the second heating element, and the control circuit equipped for measuring the temperature of the water in the steam generator by measuring the temperature of the second heating element some time after the pressure in the steam generator has reached the predetermined value or the predetermined difference and the second heating element is switched off. When the pressure in the steam generator rises to the pressure at which the pressure sensor responds, the current supply to the second heating element is interrupted. After a few seconds have elapsed, the heating element and the temperature sensor fixed thereto have assumed the temperature of the water in the steam generator. This is established due to the fact that the temperature of the heating element falls no further. The temperature then prevailing is precisely the temperature of the water in the steam generator at which steam is formed when there is renewed heat output. Measuring the temperature of the second heating element instead of the temperature in the steam generator has the advantage that the sensor need not be fitted separately in the tank and the boiling temperature can be established clearly, due to the fact that the measured fall in temperature exhibits a clearly perceptible kink.

An additional advantage of fitting the temperature sensor on the second heating element is that it can also be used as the boil-dry safety device and thus avoids the need for a separate sensor.

In yet another embodiment of the steam iron according to the invention, the control circuit is provided with a position detector, and the control circuit is equipped for closing the steam valve when the position detector indicates an unusual position. The position detector is used to detect whether the position of the iron is such that hot water can reach the steam pipe. If this is the case, the steam valve is closed, in order to prevent hot water from passing out through the steam pipe and steam outlets as a result of the excess pressure prevailing. A Hall sensor or a mercury switch are examples of what can be used as the position detector. The control circuit may also be equipped for regulating the current supply to the first heating element, and thereby the temperature of the soleplate, and first bringing the steam generator and then the soleplate to temperature while the iron is heating up. Due to the fact that the control circuit regulates not only the heating of the steam generator, but also the steam production and the heating of the soleplate, the heating of the soleplate can wait until the steam generator has reached its temperature and until the user actually begins to iron.

Additionally, the control circuit may also be equipped for regulation of the temperature of the soleplate and for bringing the steam generator and the soleplate to temperature virtually simultaneously during heating up of the iron. In this way the soleplate and the steam generator both reach the desired temperature in the shortest possible time. If both elements have a relatively low power, the two elements can be switched on simultaneously but, on the other hand, they can also be switched on alternately if they each have a high power. This latter situation has the advantage that each individual element can be driven temporarily with a high power, so that both rapid heating up of the soleplate and a high steam production are obtained.

During the ironing process there are breaks between ironing cycles, in general in order to move or replace the article being ironed. No steam is released during these breaks. Preferably, the control circuit has a presence detector or a movement detector. If a switch, leakage current switch or photoelectric cell is fitted in the handle of the iron for detecting the presence of the user, the steam delivery can be interrupted during the breaks and can be resumed immediately when the user picks up the iron again. The detection of the break can also be carried out by means of a movement detector which is provided with, for example, a mercury switch or a Hall element.

In a preferred embodiment of the steam iron according to the invention is, the control circuit has a switch for switching on only the first heating element or only the second heating element. The two heating elements are then never switched on simultaneously, which means that each of the two elements can have a high power without the electrical connections having to be dimensioned for the sum of the two powers. The reaction time for heating up soleplate and steam generator separately is thereby reduced to a minimum. Such a switch can comprise, for example, two separate switches, one for each heating element, and a control circuit by means of which the switches are controlled selectively.

In order to make the regulation of the heat output to the soleplate go directly towards heating up the article being ironed, in preferred embodiments the soleplate has a low heat capacity. This also has the advantage that when the first heating element is switched off, for example controlled by a signal from the presence or movement detector, the soleplate cools down rapidly, which makes for greater safety.

BRIEF DESCRIPTION OF THE DRAWINGS

The invention is now explained in greater detail with reference to the drawing, in which.

DETAILED DESCRIPTION OF PREFERRED EMBODIMENTS

Figure 1:
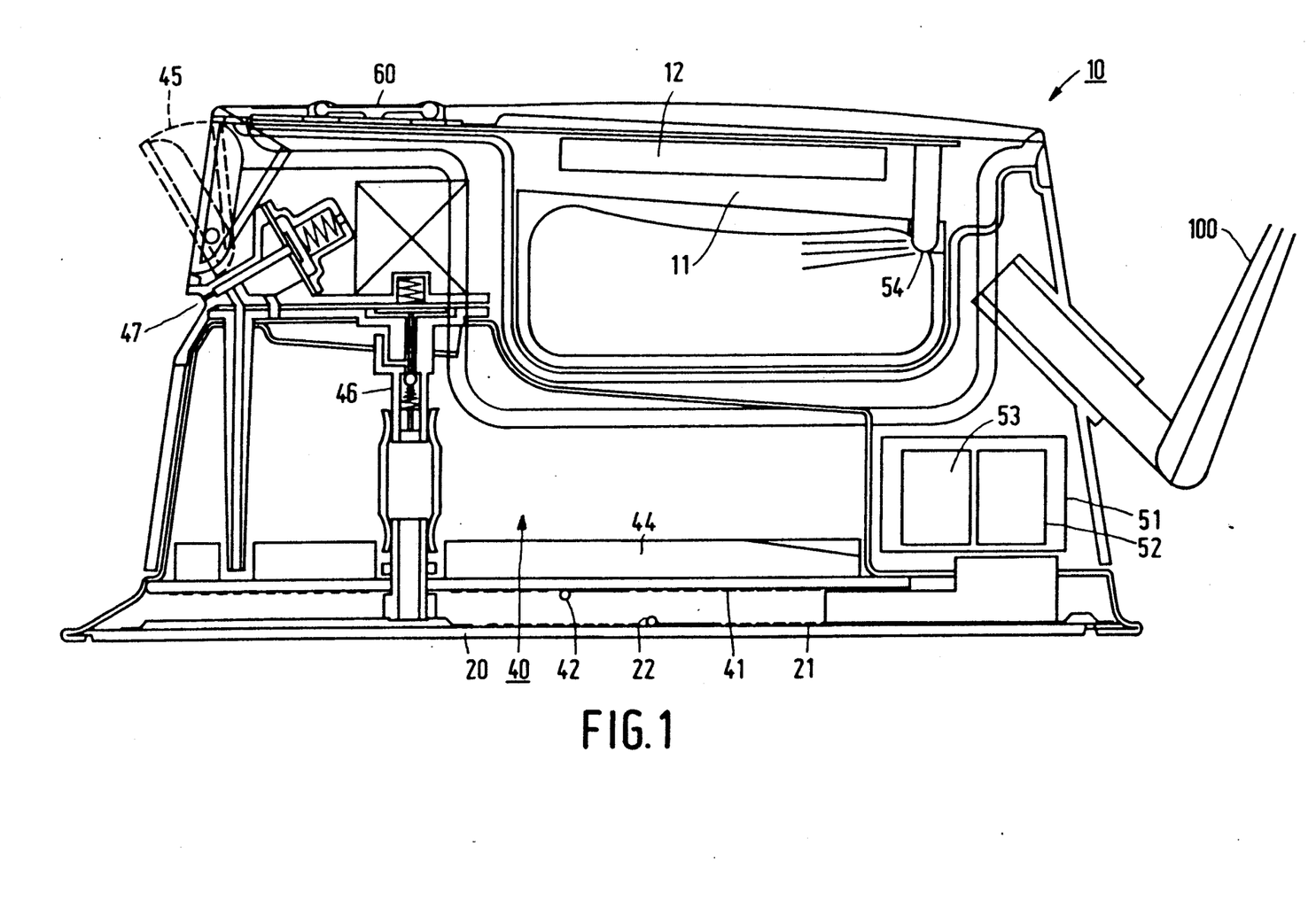
FIG. 1 shows schematically a cross section of the steam iron according to the invention.

FIG. 1 shows schematically a cross section of a steam iron according to the invention. The iron comprises a housing 10 to which a soleplate 20 is attached. The housing is formed in such a way that a handle 11 forms part of the housing. The housing also contains, inter alia, a steam generator 40 which at the same time serves as a water tank, a compartment 12 for the accommodation of the control circuit, and a control panel 60.

A first heating element 21 and a temperature sensor 22, for example an NTC resistor, are located on the top side of the soleplate. The heating element is, for example, a conducting film in which a track-pattern is formed.

The second heating element 41, for example also a film provided with a track-pattern, is located on the bottom side of the steam generator. A temperature sensor 42 is disposed on the electrical insulation of the second heating element. The bottom of the steam generator can be provided with a layer of capillary material, which makes the entire surface of the bottom remain moist, even if the steam generator is almost empty and the bottom is standing at an angle or even vertically. This prevents local overheating of the steam generator. The iron is also provided with a filling cap 45, a steam valve 46, and a sprinkler 47. The filling cap 45 is shown as a collapsible filling cap, but a different design may, of course, also be used. The steam valve 46 is used to open and close the steam pipe between the steam generator 40 and the steam passages (not shown) in the soleplate, which open out into steam outlets at the bottom side thereof. The sprinkler 47, finally, serves for additional moistening of the articles being ironed.

The iron housing also has a control circuit for controlling the temperature of the soleplate and the steam production in the steam generator. The control circuit is accommodated in a compartment 12 in the handle 11. This position was selected in order to avoid the high temperatures in the region of the soleplate or the steam generator.

An isolation transformer 51, for example, is provided for the power supply to the control circuit. This means that the control circuit has no direct contact with the mains voltage, and the control circuit can be driven by means of a low electrical voltage, which ensures greater safety. If there is adequate electrical insulation, the isolation transformer can be omitted. The iron is connected to the electricity mains by means of the flex 100.

The iron is also provided with a hand presence detector 54, which forms part of the control circuit. The presence detector can be, for example, a switch which is closed (or opened) when the handle is gripped, and is opened (or closed) when the handle is released. A touch control or leakage current switch, a photoelectric cell which is sensitive in the visible or infrared region, or a movement detector by means of which handling of the iron is detected can, however, also be used as the presence detector.

The control panel 60 has a display panel for the display of information which is useful to the user, such as an indication of the set temperature of the soleplate, and can also be provided with further indications such as indicating that the soleplate has or has not reached the set temperature, the quantity of water in the steam generator, etc. The control panel also has switches for setting the temperature, setting the degree of steam delivery, for operation of the sprinkler, and causing the release of an additional steam surge.

Two relays 52 and 53 are disposed near the transformer 51, in order to switch on and off the two heating elements 21 and 41 in response to control signals from the control circuit.

Figure 2:
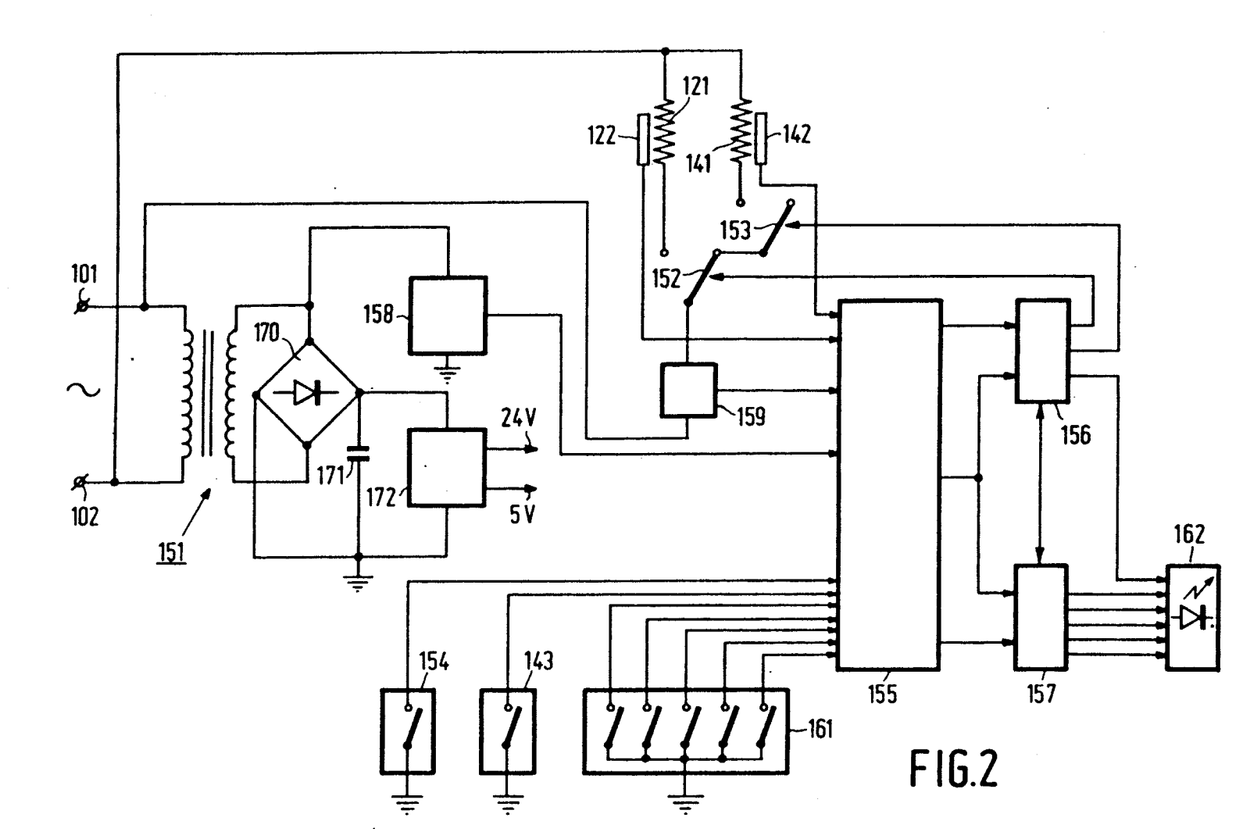
FIG. 2 shows schematically one embodiment of the control circuit.

FIG. 2 shows schematically a preferred embodiment of the control circuit.

The mains voltage, for example 220 V/50 Hz, is supplied by means of the connections 101 and 102 to the primary side of the transformer 151, and by means of two relay switches 152 and 153 to the two heating elements 121 and 141 for the soleplate and the steam generator respectively. A rectifier 170 is connected to the secondary connections of the transformer 151, and a smoothing capacitor 171 and a low-voltage supply circuit 172 are connected to the output of said capacitor. The supply circuit 172 supplies stabilized voltages of, for example, 5 and 24 volts for the control circuit. The way in which the supply voltages are obtained and in which they are supplied to the various parts of the circuit is not indicated any further here.

The heating elements 121 and 141 have a high power, for example 1300 W each, in order to make the heating-up time of the soleplate and the steam generator as short as possible. Since a total power of around 2600 W is greater than the maximum power which an ordinary electrical unit in a dwelling can supply to a single domestic appliance, and since a much lower average power is sufficient to maintain the soleplate and the steam generator at the correct temperature, the two heating elements are not switched on simultaneously. For this purpose, the relay switches 152 and 153 are disposed in such a way that the soleplate 121 is switched on and off by the relay 152, while the relay 153, which only takes effect when the soleplate is switched off, can switch the second heating element 141 on and off. It is pointed out that the heating elements 121 and 141 can also be switched by other switching elements, for example Triacs. In that case a different design of switching circuit is, of course, required.

The switches 152 and 153 are controlled by a microcomputer 155 with control software. The microcomputer is, for example, of the NEC 7556 type. At the outputs of the microprocessor, which are shown in the drawing on the righthand side, there are two interface circuits 156 and 157 for conversion of the output signals of the microprocessor to a current intensity suitable for the relays 152 and 153.

Shown on the lefthand side of the microprocessor 155 are the connections of the detectors and the switches to which the control program reacts. Temperature sensors 141 and 142, for example NTC resistors, are provided at the heating elements 121 and 122, for measuring the temperature of the heating elements. A switch detector 159 is also provided in the supply circuit of the heating elements and gives off a bivalent signal, the value of which depends on whether or not one of the heating elements is switched on.

The control circuit has a phase detector 158, by means of which the switches 152 and 153 can be switched at times at which the mains voltage is going through zero. This prevents disruptive interference in the electricity mains and extends the service life of the switches. Other conditions which are fed to the microprocessor are the presence of the user, for which a signal is generated by the presence detector 154, the pressure in the steam generator, which is detected by means of a pressure sensor 143, and the position of the control switches on the control panel 161. Other signals not indicated in any further detail can also be used. For example, a detector for the position of the filling cap is possible, so that the heating elements are switched off if the filling cap is open, and a position switch by means of which the steam valve is closed if the iron is being held in an unusual position, so that no hot water can emerge or pass out through the steam outlets.

The pressure sensor can be, for example, a simple switch which is opened when the pressure in the steam generator is below a threshold value and closed when the pressure is higher than the threshold value.

The control panel 161 has a number of switches for setting the temperature of the soleplate, for selecting a degree of steam delivery, and for requesting a maximum quantity of steam during a short period of time (steam surge).

Apart from the operation of the switches 152 and 153, the microprocessor, via interfaces 156 and 157, gives information for the user on a display panel 162. This information relates, for example, to the set and actual temperature of the soleplate, and to the quantity of water still present in the steam generator.

In addition to regulation of the temperature of the soleplate and of the steam delivery, the microprocessor can further increase the safety of the iron by switching the iron off automatically after some time of non-use. This is, for example, achieved in two steps. First, the heating of the soleplate is switched off once the presence detector 154 indicates that the user has stopped ironing. When the temperature of the soleplate has dropped to a value which can be considered safe as regards scorching the articles being ironed, the soleplate is maintained at this temperature. The safe temperature can be, for example, 70% of the set temperature, but it can also be a fixed value, for example 100° C. or less if the set temperature is lower. Since the heating element 121 has a high power, the soleplate reaches the set temperature again a short time after the iron is picked up again. Both the rapid cooling and the rapid heating-up mean that the soleplate requires a considerably lower heat capacity than is at present customary in irons.

If the iron has not been used for quite a long time, say 10 minutes, the heating elements are switched off completely, so that the iron cools down completely. In that case the steam valve is also opened, so that the excess pressure in the steam generator disappears. In the case of lengthy non-use the chance of an unsafe situation is thus restricted to a minimum.

Figure 3A:
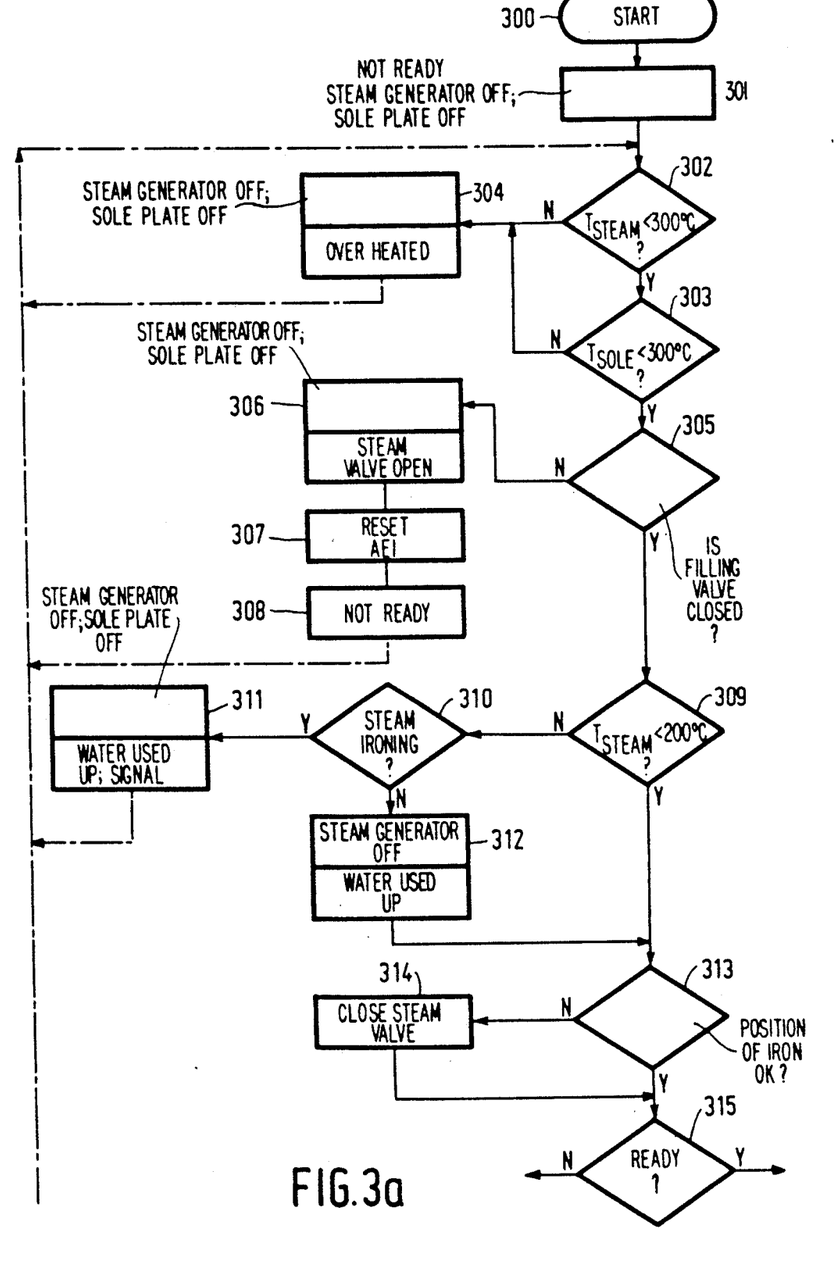
FIGS. 3a, 3b, 3c and 3d show the steam flow chart of a control program.
Figure 3B:
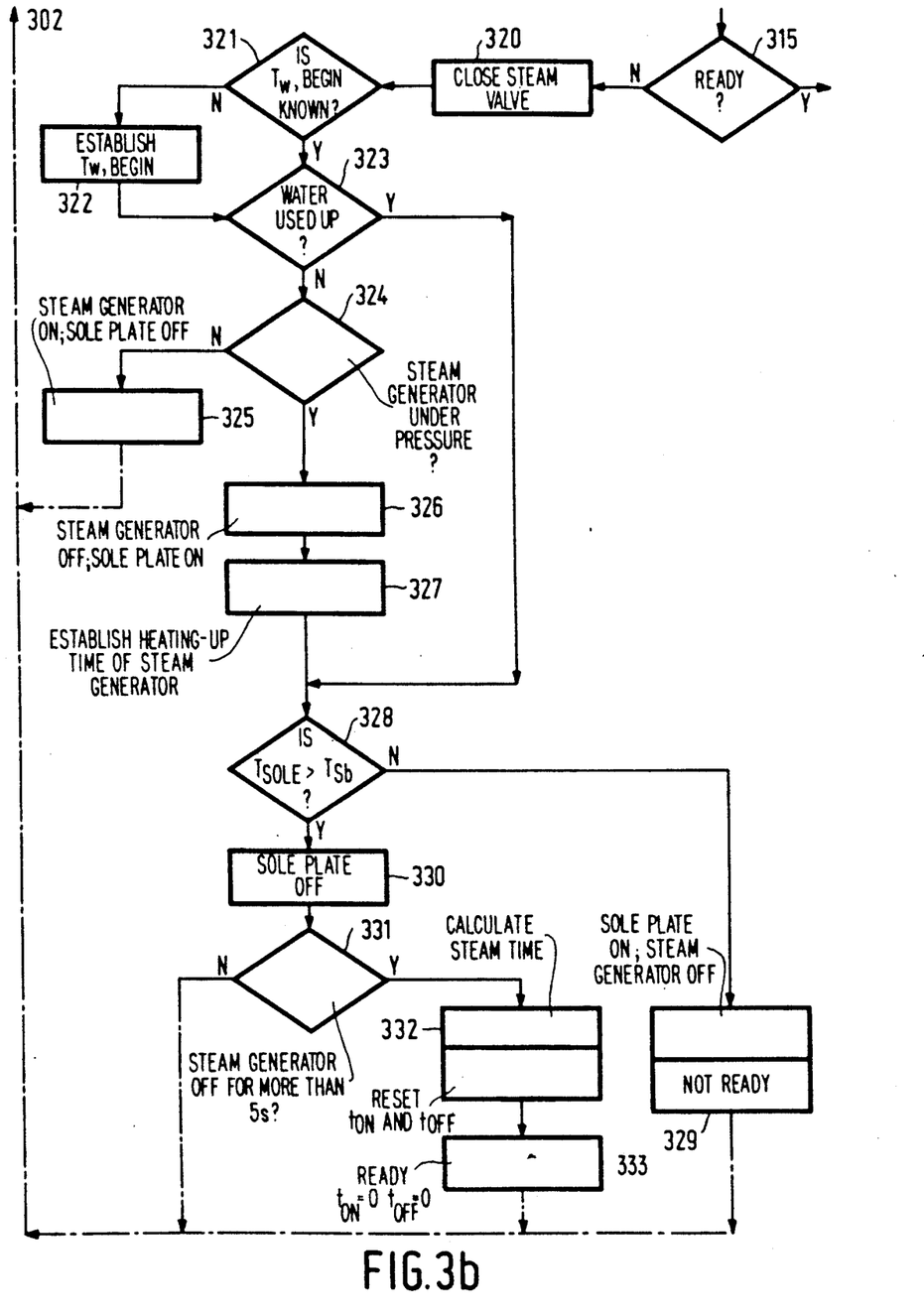
Figure 3C:
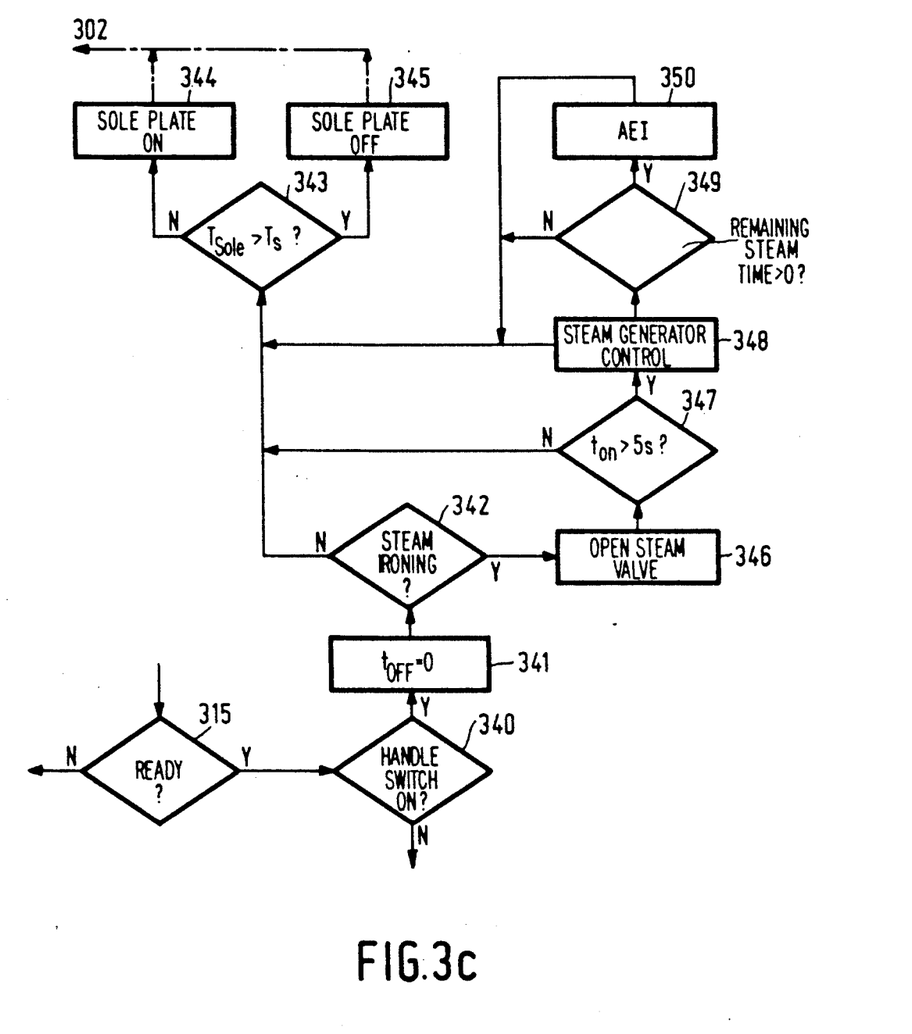
Figure 3D:
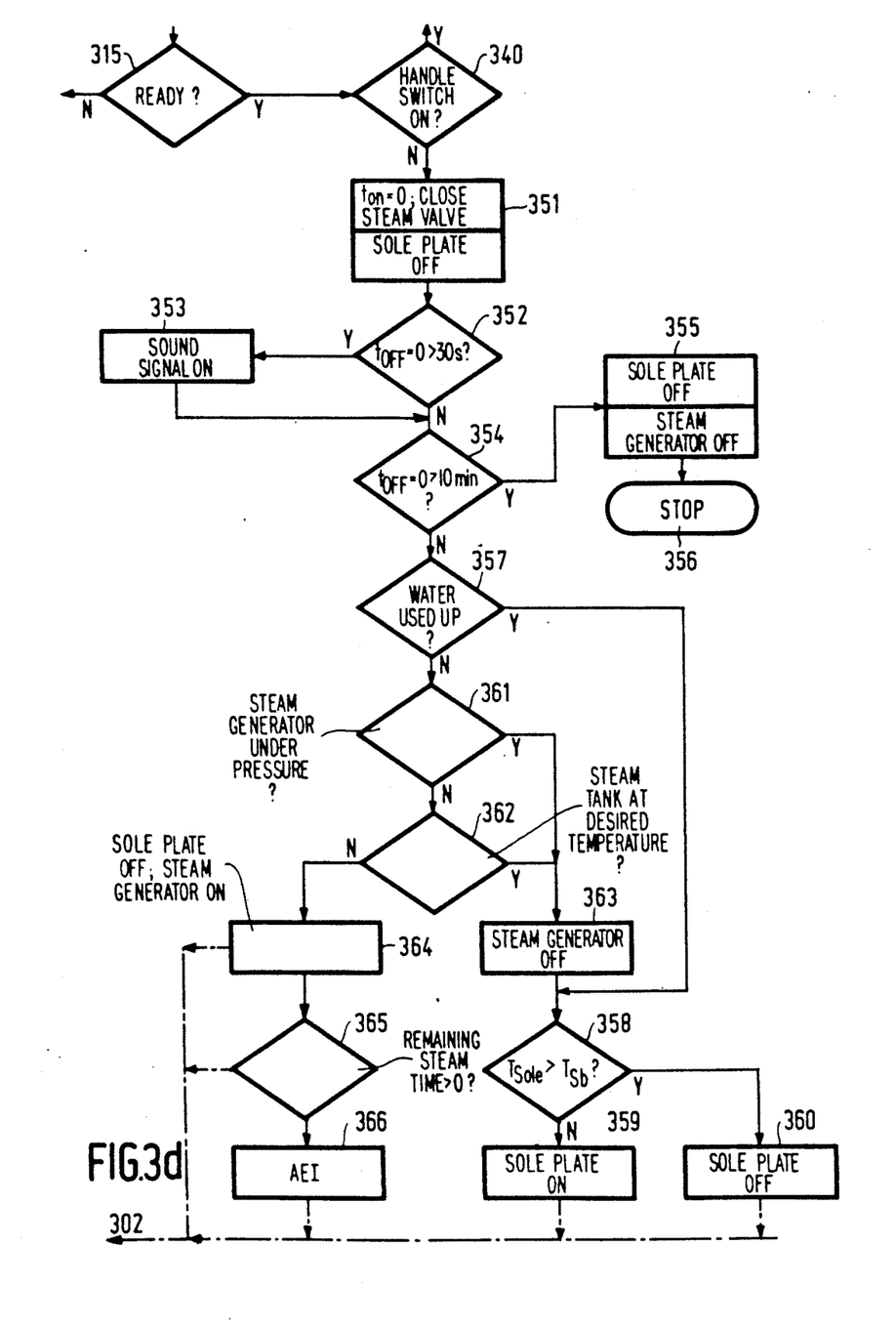

FIGS. 3a, 3b, 3c and 3d show a possible control program in the form of a flow chart. In this flow chart four parts can be distinguished, each of which is described with reference to one of the figures. FIG. 3a shows the checking of the iron, FIG. 3b the heating-up phase, FIG. 3c shows the part of the program which is carried out when ironing is actually taking place, and FIG. 3d shows the program part which is run when the ironing is interrupted. The checking of the iron shown in FIG. 3a is run through during each program cycle. For each cycle only one of the other program parts is run.

As indicated in FIG. 3a, when the program is started (block 300), the condition "not ready" is generated, and the two heating elements are switched off (block 301). The next block, 302, is also the beginning of each program cycle. In it the temperature of the steam generator $T_{steam}$, is measured and compared with a maximum value, for example, 300° C. If this maximum temperature is not exceeded, the temperature of the soleplate, $T_{sole}$, is compared with a maximum value, for example also 300° C. (303). If one of the two temperatures is higher than the maximum set for it, as indicated by block 304, the two heating elements are switched off, and the condition "overheated" is generated and displayed on the display panel.

If both temperatures are below the maximum, it is checked whether the filling valve is open or shut (block 305). If it is open, both heating elements are switched off, the condition "not ready" is generated (306; 308), and any existing almost empty indication for the steam generator is turned off (307). The steam valve is also opened. Since the filling valve is clearly visible, there is no need for an indication on the display panel that it is open.

If the filling valve is closed, the presence of water in the steam generator is determined (309). Water is considered to be present if the temperature is lower than a certain value, say 200° C. If the temperature is higher, then there is obviously no water in the steam generator, and the further course of the program depends on the setting of the iron on dry ironing or steam ironing (block 310). If dry ironing is required, the heating element of the steam generator is switched off and the condition "water used up" is indicated on the control panel (312). If steam ironing is selected, both heating elements are switched off, and a clearly visible, and possibly an audible, signal is generated besides the condition "water used up" (311). Another action such as, for example, automatically switching over to dry ironing is, of course, also possible.

During the checks it can also be ensured whether the position of the iron is a position occurring during normal use (block 313), in other words, that the lowest point is the sole or heel. If the iron goes into an abnormal position, for example upside down or with the tip down, hot water can always pass out through the steam pipe and the steam outlets. In order to prevent this, the steam valve is closed when the iron is in an abnormal position, as indicated by block 314.

If on one of the checks it is found that the condition of the iron does not permit ironing, the program begins checking the temperature again (block 302). On the other hand, when all checks have been run through, it is determined whether the condition "ready" has occurred (315). If it has, the program goes into the active ironing position or to the standby position. If it has not, the heating-up phase goes into operation, the course of which is described further with reference to FIG. 3b.

The program part which is shown in FIG. 3b is carried out when the iron has been checked and no undesirable conditions have been found, but it is not ready for use. At the beginning of this program part, the steam valve is closed, according to block 320. If the initial temperature of the water, $T_w$,begin, is not known (321), it is measured (block 322). The condition "water used up" is then tested (323). If this condition is true, dry ironing is apparently desired, and the condition of the steam generator is not taken into any further consideration. If this condition is not true, and there is water present in the steam generator, the steam pressure is checked (324). If there is insufficient steam pressure, the heating element of the steam generator is turned on and that of the soleplate turned off (325). If there is sufficient pressure, the steam generator switches off, and the soleplate switches on (326).

The temperature of the soleplate is compared with the standby temperature, $T_{sb}$ (328). This is the temperature at which the soleplate is maintained when the iron is not in use. The standby temperature can depend on the set temperature and can be, say, 70% of it, or can be equal to a fixed value, for example 100° C., or lower if the set temperature is lower than this fixed value.

If the temperature of the soleplate is lower than the standby temperature, the heating element in the soleplate is switched on, that of the steam generator is switched off, and the condition "not ready" occurs or is maintained (329). If the soleplate is at the correct temperature, its heating element is switched off (330).

Before the "ready" signal is given, there is an initial waiting period until the heating element of the steam generator has been switched off for a number of seconds, for example 5 seconds (331). In this time the temperature sensor of the heating element assumes the temperature of the water in the steam generator, so that this temperature, which depends on the pressure in the steam generator, can be used as a control variable for control of the steam delivery. When this period has elapsed, the water temperature is stored in the memory. The time necessary to heat the steam generator is also recorded. The quantity of water in the steam generator can be calculated from this, together with the initial temperature (322). Two registers, $t_{on}$ and $t_{off}$, indicating how long ironing has taken place and how long the iron has been in a standby position, are both reset, and the condition "ready" is set (333). The iron is now ready for use.

The program then runs through the checking part again, beginning at block 302 (FIG. 3a). If the iron is ready for use (315), the ironing program (FIG. 3c) or the standby program (FIG. 3d) is carried out, depending on the position of the handle switch.

FIG. 3c illustrates the part of the program which is carried out during ironing. Each time the program runs through this part, the register, $t_{off}$, which indicates the duration of the current standby period, is reset (341). The course of the program thereafter depends on the selection of steam ironing or dry ironing (342). If dry ironing is selected, the temperature of the soleplate $T_{sole}$ is compared with the set temperature $T_s$ (343). Depending on the result of this comparison, the heating of the soleplate is switched on or off (344; 345).

When ironing is being carried out with steam, the steam valve is opened (346), and the contents of the register ton, which indicate the time which has elapsed from the beginning of the current ironing cycle, are compared with a predetermined duration, for example 5 seconds (347). So long as this time is not exceeded, no further action is undertaken by the program other than to regulate the temperature of the soleplate in the manner described above. During this period steam is delivered through the steam outlets without additional heating of the steam generator. The energy required for the formation of the steam is supplied through a fall in the water temperature in the steam generator. It should be remembered here that an excess pressure of approximately $10^5$ Pa, and thus a temperature of approximately 120° C., prevails in the steam generator.

At the end of this time the heating element of the steam generator can be switched on. Whether or not this takes place depends on the average power which has to be supplied to the steam generator. The heating element is switched on depending on the steam requirements during an ironing cycle. The element is switched on for a short time and switched off again just afterwards, following which the program goes on and regulates the soleplate temperature in the manner described above by means of the temperature sensor. The ratio between on and off time—and thus the average power which is supplied to the steam generator—is, for example, constant, is of a predetermined duration, or depends on the heat delivery by the soleplate. This heat delivery is measured by determining the ratio between the length of time that the heating element of the soleplate is switched on and the length of time that it is switched off. If the power to be supplied to the steam generator is, say, 600 W, and the output of the heating element is 1300 W, then the on and off times will be in a ratio of 6:7. 600 W corresponds to a steam delivery of approximately 15 g/min. In the flow chart according to FIG. 3c the control of the steam delivery through switching of the heating element is accommodated in the block 348.

On the basis of the determination of the water quantity in the heating phase, the length of time which the heating element must be on must be calculated, in order to make all the water in the steam generator vaporize. In block 349 this calculated length of time, corrected for losses, is compared with the actual length of time that the element has been switched on. When the calculated length of time has elapsed, a signal is given that topping-up with water is necessary, the "almost empty indication" or AEI (350).

The flow chart in FIG. 3d is run through when the iron is ready for use, but is not being used. Once this program part is run through, the register $t_{on}$, which indicates the length of time within the current ironing cycle, is reset, the steam valve is closed, the heating element of the steam generator is turned on, and the soleplate heating is switched off. The remaining procedure depends on the value in register $t_{off}$, which indicates the duration of the current standby period.

If this value is higher than a fairly short period, for example 30 seconds (352), a sound signal is given (353). If the iron has been on standby for more than a fairly long period, for example ten minutes (354), both heating elements are switched off, so that the iron cools down completely and opens the steam valve if necessary.

The iron is maintained in the standby condition until the ten minutes have elapsed. If the "water used up" condition exists (357), the temperature of the soleplate $T_{sole}$ is compared with the standby temperature $T_{sb}$ (358). The soleplate is then switched on or off depending on the result of the comparison (359, 360). If, on the other hand, water is present in the steam generator, the pressure in the steam generator is measured (361). If it is at the maximum value, then the heating of the steam generator is turned off (362) and the soleplate temperature is checked and adjusted if necessary (358, 359, 360). If the degree of steam delivery is set at a less than maximum initial steam delivery, it is not the pressure in, but the temperature of the steam generator which is measured (362). If it is at the desired value, the heating element is switched off (363) and control of the soleplate temperature then takes place (318, 359, 360). If the temperature or the pressure in the steam generator is inadequate, the steam generator heating is switched on (364). As in the program part which is active during ironing, here too it is possible, by measuring the length of time that the steam generator heating is switched on, to give an indication of when the steam generator is almost empty, the AEI signal (365, 366).

The flow chart shown is intended only to give an idea of how the control program works and does not pretend to show the program in detail. For example, in the part which is run through during ironing (FIG. 3c) the controls for the sprinkler and giving of an additional quantity of steam (steam surge) are not shown. In the chart shown, in the heating-up phase and standby phase, the regulation of the temperature or pressure in the steam generator take precedence over the regulation of the soleplate temperature, but this can be otherwise.

FIGS. 4a, 4b, 4c, 4d and 4e show a number of possible variants of the way in which the steam delivery can be regulated as a function of time.

Figure 4A:
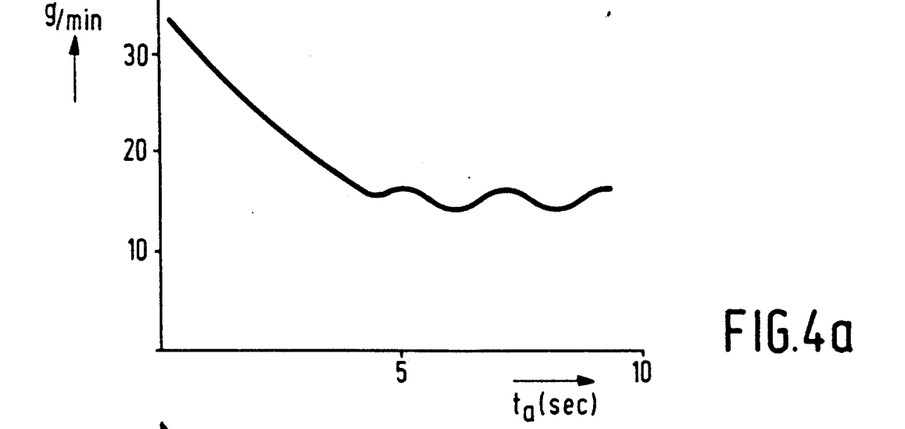
FIGS. 4a to 4e show a number of variants of the degree of steam delivery during an ironing cycle.

FIG. 4a shows a steam program which starts at a steam delivery of 35 g/min, falls to 15 g/min during the ironing cycle, and is stabilized at that level. In this case there is only one steam program which is used in all circumstances.

Figure 4B:
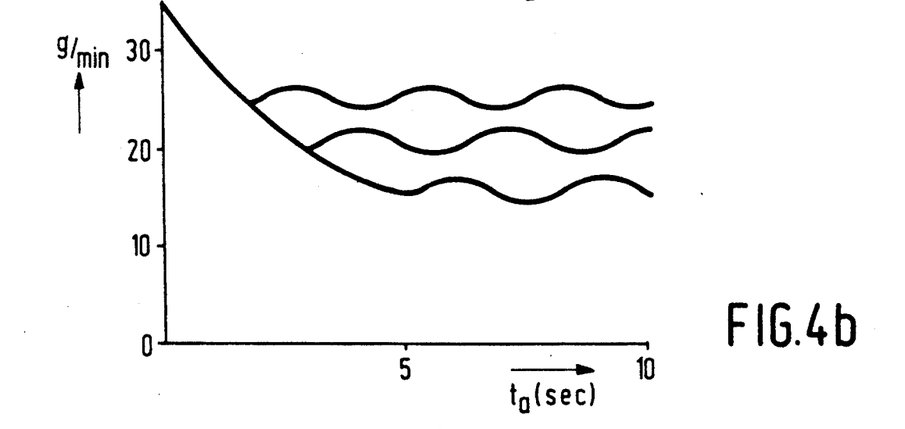

The program shown in FIG. 4b also starts at a level of about 35 g/min, but subsequently falls to a level which is preset by means of a control button on the iron. The quantity of steam can, for example, be indicated by 1, 2 or 3 illuminating spots for, say, a steam delivery of 15, 20 or 25 g/min.

Figure 4C:
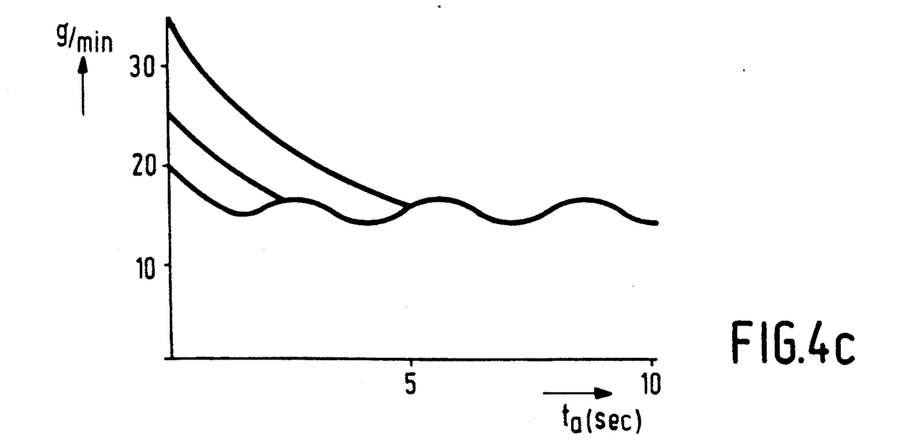

In the graph shown in FIG. 4c there are three different starting levels for the steam. All three of them are stabilized at the same level of approximately 15 g/min. The control and indication are the same as in the variant mentioned above.

Figure 4D:
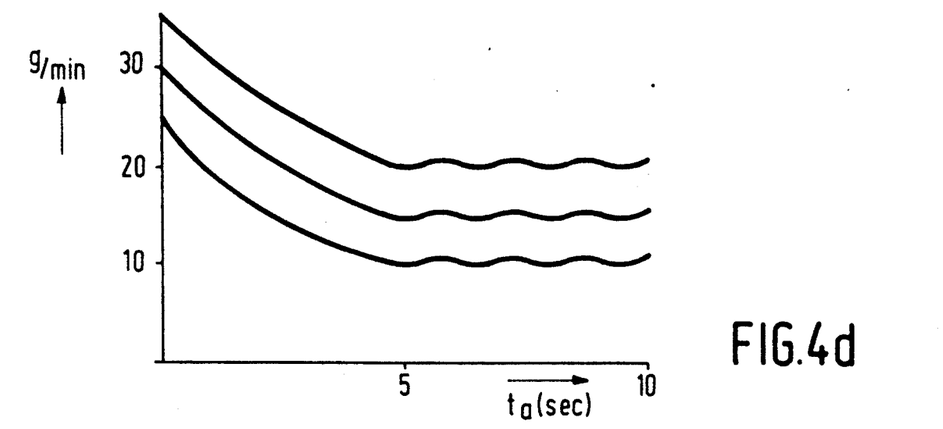

FIG. 4d shows a combination of the above two variants. Both the beginning and end level of the steam are variable. In the graphs shown they are not adjustable separately. Each starting level thus has its own end level. The operation and indication are the same as what are described in the case of FIG. 4b.

Figure 4E:
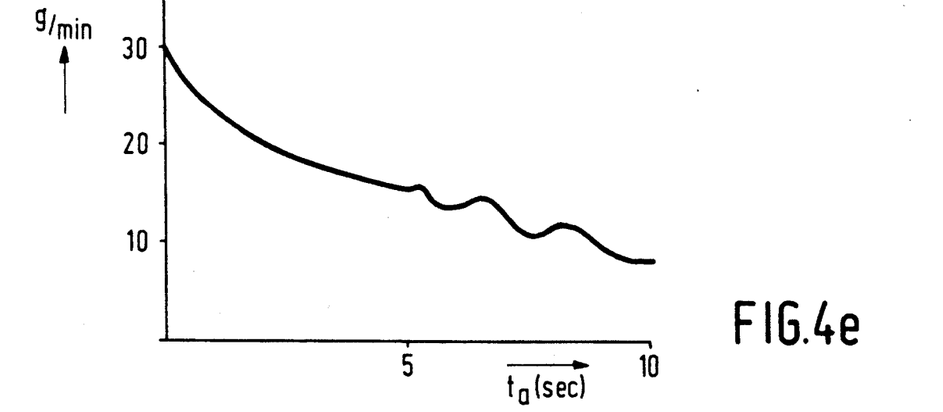

In the variant according to FIG. 4e the end level of the steam falls gradually as a function of time.

The initial level of the steam always depends on the initial pressure in the steam generator, which is determined by a pressure controller or by regulation of the temperature. In the variants according to FIG. 4a, 4b and 4e that pressure is always equal to the switching pressure of the pressure controller, i.e. to the excess pressure. The speed at which the steam level decreases depends on the pipe resistance and can be constant or can be set by means of a control valve fitted for the purpose. In the heating-up phase the steam generator is brought to pressure and in the stand-by phase it is maintained at pressure after being brought to pressure again if necessary.

During an ironing cycle the steam valve is opened, and pressure and temperature in the tank decrease while the steam flows away. The steam level is stabilized at a particular level by supplying an adequate quantity of energy to the tank. For 15 g/min it is 600 W. This means that a 1300 W element has to be on 600/1300th part of the time.

The on and off times are selected in such a way that the user cannot notice any appreciable fluctuations in the steam production. The off time of the tank is used to heat the soleplate additionally. It has been found that a cycle time of three to four seconds is adequate for this. During the first downward part in the graphs no energy is supplied to the steam generator, so that the full capacity is then available for the soleplate, which then has to be raised from the standby temperature to the working temperature.

The starting point for energy supply to the steam generator can be determined in two ways: a fixed opening time of the steam valve, say about five seconds, or until the water has reached a specific temperature.

Figure 5:
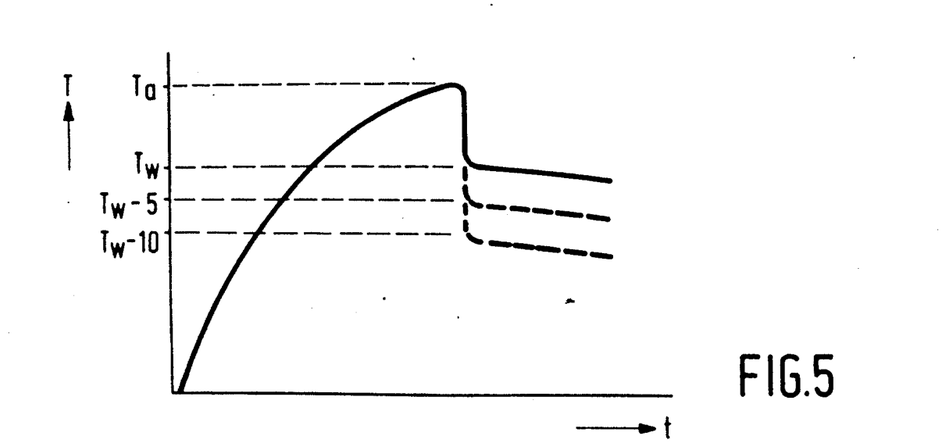
FIG. 5 shows the temperature curve of the temperature of the second heating element, during the warming-up phase.

The variants shown in FIGS. 4c and 4d with different starting levels of the steam require a different approach for not all steam levels can be regulated by means of one pressure controller. This approach is illustrated in FIG. 5. In the heating-up phase the water is heated up until the moment that the pressure controller switches on. The temperature is then $T_a$. The heating element of the steam generator is then switched off, and the temperature of the steam generator, the element and the sensor then falls very rapidly to the water temperature $T_2$. That point is easily recognizable by a sharp kink in the temperature curve. $T_w$ is stored in the memory as the temperature belonging to the highest steam pressure, and thus also to the highest initial steam delivery.

An initial steam delivery is derived from $T_w$ by not regulating the steam generator by pressure in the standby phase, but by temperature, for example $T_w - 5°$ C. for the mean value of the steam delivery level and $T_w - 10°$ C. for low level of steam delivery. This is carried out by always giving a few seconds of power to the steam generator when the temperature falls below the desired value.

An embodiment of the iron can be provided with a steam generator which works at atmospheric pressure. In that case there is no pressure sensor, and the checking of the steam generator, as shown in the chart of FIG. 3 in blocks 324 and 361, must be carried out on the basis of the difference between the temperature of the steam generator and the boiling point of water at the prevailing atmospheric pressure. This boiling point must be determined during the heating-up phase, for example in the program part indicated by the block 332.

Block 347 is also unnecessary then, since in that case the steam generator has no buffer stock of steam.

I claim:

1. An electric steam iron, comprising a housing, a soleplate connected thereto and provided with steam outlets, a first heating element for heating of the soleplate, a steam generator connected via a steam pipe to the steam outlets in the soleplate, and a second heating element for heating the steam generator, the steam iron having a control circuit for regulating the output power of the second heating element during a period of active ironing to produce a varying amount of steam by the steam generator in said period.

2. A steam iron according to claim 1, wherein the control circuit is designed in such a way that the output power from the second heating element decreases at least during part of the period of active ironing.

3. A steam iron according to claim 2 wherein the control circuit has time-measuring means and is equipped for regulation of the output power of the second heating element at least partly as a function of the time elapsing during the period of active ironing.

4. A steam iron according to claim 2 provided with means for measuring the heat output of the first heating element, and wherein the control circuit is designed for controlling the output power of the second heating element at least partly as a function of the heat output.

5. A steam iron according to claim 2 wherein the control circuit is designed for regulating the output power of the second heating element in such a way that the temperature of the steam generator is maintained when no steam is required.

6. A steam iron according to claim 2 wherein the control circuit has a temperature sensor for measuring the temperature of the steam generator, and the control circuit is equipped for determining the boiling temperature of the water in the steam generator by measuring the temperature change per unit time.

7. A steam iron according to claim 2 wherein the control circuit is provided with a position detector, and the control circuit is equipped for closing the steam valve when the position detector indicates that the iron is in a position other than the position occurring during normal use.

8. A steam iron according to claim 1, provided with means for measuring the heat output of the first heating element, and wherein the control circuit is designed for controlling the output power of the second heating element at least partly as a function of the heat output.

9. A steam iron according to claim 1, wherein the control circuit is designed for regulating the output power of the second heating element in such a way that the temperature of the steam generator is maintained when no steam is required.

10. A steam iron according to claim 1, wherein the control circuit has a temperature sensor for measuring the temperature of the steam generator, and the control circuit is equipped for determining the boiling temperature of the water in the steam generator by measuring the temperature change per unit time.

11. A steam iron according to claim 1, wherein the steam pipe comprises a steam valve for shutting off the steam pipe and wherein the steam generator comprises a pressure tank wherein pressure builds relative to the ambient pressure.

12. A steam iron according to claim 11, wherein the control circuit has a temperature sensor for measuring the temperature of the steam generator and a pressure sensor for measuring the pressure in the steam generator, and wherein the control circuit is designed for determining the maximum temperature when the pressure in the steam generator is equal to a predetermined value or is of a predetermined difference from the ambient pressure.

13. A steam iron according to claim 4 wherein the control circuit is provided with a position detector, and the control circuit is equipped for closing the seam valve when the position detector indicates that the iron is in a position other than the position occurring during normal use.

14. A steam iron according to claim 1, wherein the control circuit is also equipped for controlling the steam supply to the first heating element and thereby the temperature of the soleplate, and first bringing the steam generator and then the soleplate to temperature while the iron is heating up.

15. A steam iron according to claim 1 wherein, the control circuit is also equipped for regulation of the temperature of the soleplate and for bringing the steam generator and the soleplate to temperature virtually simultaneously during heating up of the iron.

16. A steam iron according to one claim 1 characterized in that the control circuit has a presence detector.

17. A steam iron according to claim 1 wherein the control circuit has a movement detector for detecting ironing movements.

18. A steam iron according to claim 1, the control circuit has a switch for switching on only the first heating element or only the second heating element.

19. A steam iron according to claim 18, wherein the soleplate has a low heat capacity.

20. An electric steam iron comprising a housing, a soleplate connected thereto and provided with steam outlets, a first heating element for heating of the soleplate, a steam generator connected via a steam pipe to the steam outlets in the soleplate, and a second heating element for heating the steam generator, the steam iron having a control circuit for regulating the output power of the second heating element during an ironing cycle, the control circuit having time-measuring means and being equipped for regulation of the output power of the second heating element at least partly as a function of the time elapsing during an ironing cycle.

21. An electric steam iron comprising a housing, a soleplate connected thereto and provided with steam outlets, a first heating element for heating of the soleplate, a steam generator connected via a steam pipe to the steam outlets in the soleplate, and a second heating element for heating the steam generator, the steam iron having a control circuit for regulating the output power of the second heating element during an ironing cycle,
  the steam pipe comprising a steam valve for shutting off the steam pipe;
  the steam generator having a pressure tank wherein pressure build up relative to the ambient pressure;
  the control circuit comprising a temperature sensor disposed on the second heating element for measuring the temperature of a steam generator and a pressure sensor for measuring the pressure in the steam generator; the control circuit also being equipped for measuring the temperature of the second heating element after the pressure in the seam generator has reached a predetermined value or has reached the predetermined difference from the ambient pressure and the second heating element is switched off.

22. An electric steam iron comprising a housing, a soleplate connected thereto and provided with steam outlets, a first heating element for heating of the soleplate, a steam generator connected via a steam pipe to the steam outlets in the soleplate, and a second heating element for heating the steam generator, the steam iron having a control circuit for regulating the output power of the second heating element during an ironing cycle, the control circuit having time-measuring means and being equipped for regulation of the output power of the second heating element at least partly as a function of the time elapsing during an ironing cycle;

the steam pipe comprising a steam valve for shutting off the steam pipe;

the steam generator having a pressure tank wherein pressure builds relative to the ambient pressure; the control circuit being provided with a position detector, and being equipped for closing the steam valve when the position detector indicates that the iron is in a position other than the position occurring during normal use.

* * * * *